United States Patent [19]

Hodge

[11] Patent Number: 4,857,113
[45] Date of Patent: Aug. 15, 1989

[54] VEHICLE CLEANSING METHOD

[75] Inventor: Robert J. Hodge, Colorado Springs, Colo.

[73] Assignee: Grace-Lee Products, Inc., Minneapolis, Minn.

[21] Appl. No.: 261,521

[22] Filed: Oct. 24, 1988

Related U.S. Application Data

[60] Continuation of Ser. No. 100,098, Sep. 23, 1987, abandoned, which is a division of Ser. No. 812,740, Dec. 23, 1985, Pat. No. 4,716,916.

[51] Int. Cl.$^4$ .............................................. B08B 1/02
[52] U.S. Cl. ...................... 134/32; 134/34; 134/123; 134/171; 134/25.4; 15/DIG. 2; 118/323
[58] Field of Search ............... 134/32, 25.4, 25.1, 134/18, 21, 123, 45, 172, 181; 15/DIG. 2; 118/323

[56] References Cited

U.S. PATENT DOCUMENTS

| | | | |
|---|---|---|---|
| 1,866,197 | 7/1932 | Cunningham . | |
| 2,221,876 | 11/1940 | Mackin | 134/45 |
| 2,419,397 | 4/1947 | Fronoff et al. | 134/123 |
| 3,038,481 | 6/1962 | Brechtel | 134/123 |
| 3,259,138 | 7/1966 | Heinicke . | |
| 3,339,565 | 9/1967 | Williams | 134/123 X |
| 3,391,701 | 7/1968 | Richardson et al. . | |
| 3,432,346 | 3/1969 | Hurst . | |
| 3,445,286 | 5/1962 | Smith et al. | 134/32 |
| 3,481,346 | 12/1969 | McBurnett . | |
| 3,529,611 | 9/1970 | Daum et al. . | |
| 3,557,808 | 1/1971 | Gusse et al. . | |
| 3,578,775 | 5/1971 | McMillen | 134/45 |
| 3,650,281 | 3/1972 | Hurst . | |
| 3,658,590 | 4/1972 | Huebner et al. | 134/32 |
| 3,701,356 | 10/1972 | Hanna et al. . | |
| 3,844,836 | 10/1974 | Lesser | 134/32 |
| 4,716,916 | 1/1988 | Hodge | 134/23 |

FOREIGN PATENT DOCUMENTS

| | | | |
|---|---|---|---|
| 512466 | 7/1952 | France | 134/123 |
| 378016 | 7/1932 | United Kingdom | 134/45 |
| 509504 | 1/1939 | United Kingdom | 134/123 |
| 639752 | 1/1950 | United Kingdom | 134/45 |

Primary Examiner—Asok Pal
Attorney, Agent, or Firm—R. C. Baker

[57] ABSTRACT

The system for cleansing exterior surfaces of vehicles has horizontal arrays of plural zero degree solid stream nozzles in spaced relationship along the linear length of the arrays. The zero degree nozzles are at an angular orientation with respect to the linear length of each array such that the solid streams emitted from them are from 40° up to about 80° from the linear length. Each array is equipped with elements for oscillating the array in a direction transverse to the linear length thereof. The system includes elements for effecting relative linear motion lengthwise between a vehicle undergoing treatment and the horizontal oscillatable arrays, with each array laterally parallel to a side of the vehicle. Ends of a vehicle as well as sides can be cleaned with the angularly impacting solid streams from the arrays during the relative linear motion even though the arrays are laterally parallel to the length of the vehicle.

12 Claims, 3 Drawing Sheets

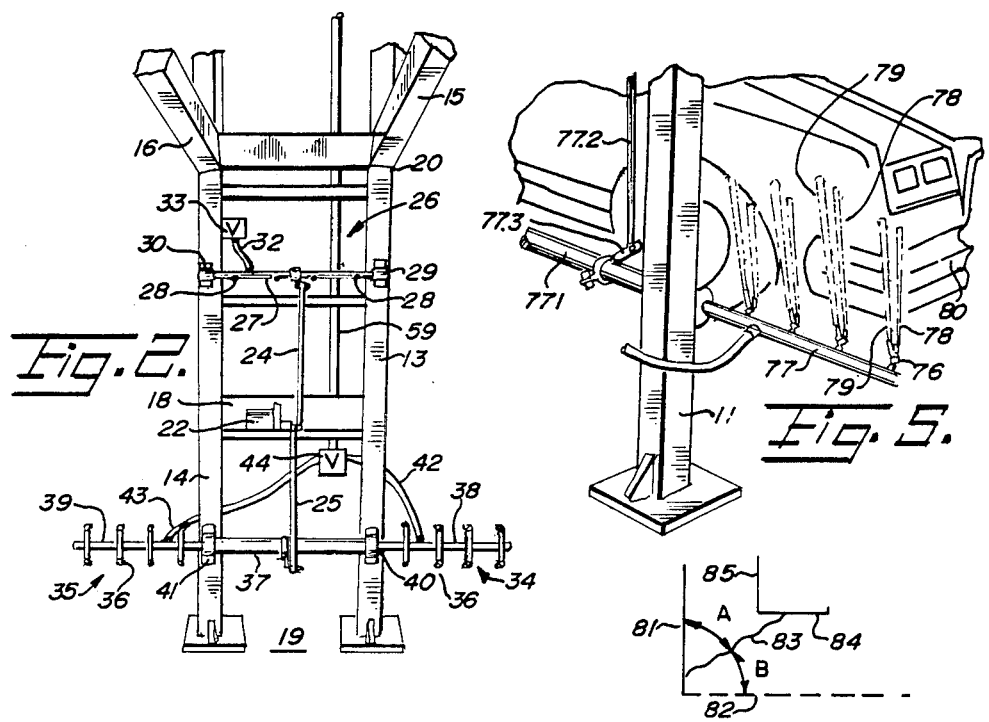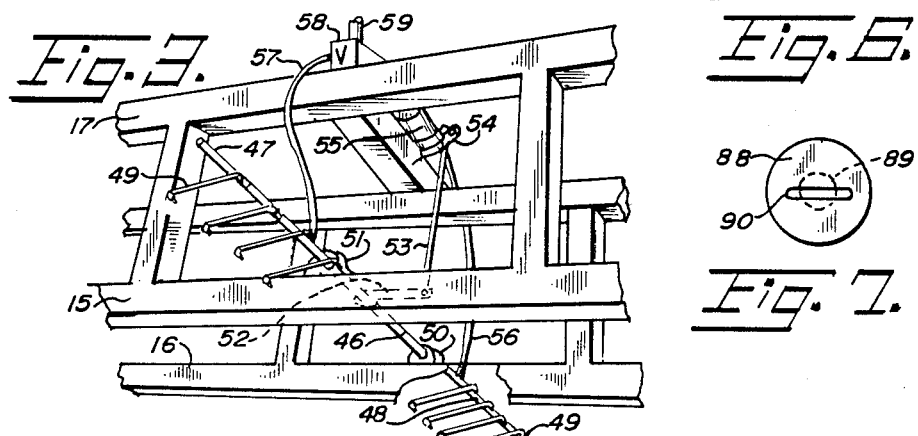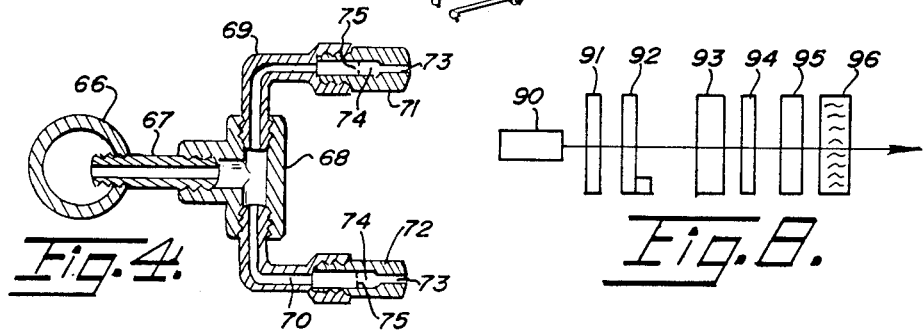

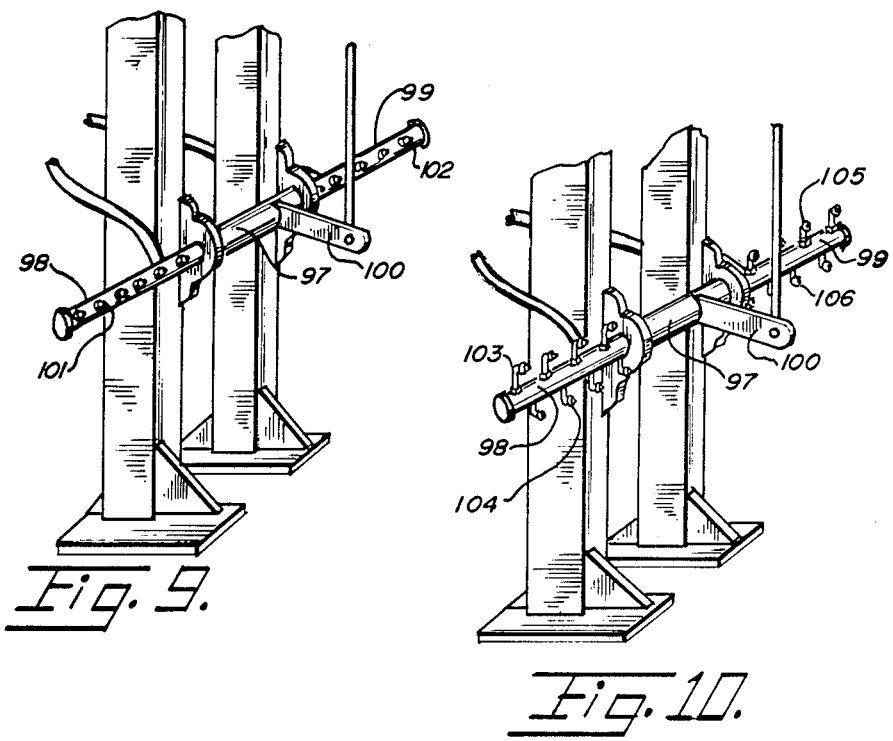
Fig. 9.
Fig. 10.
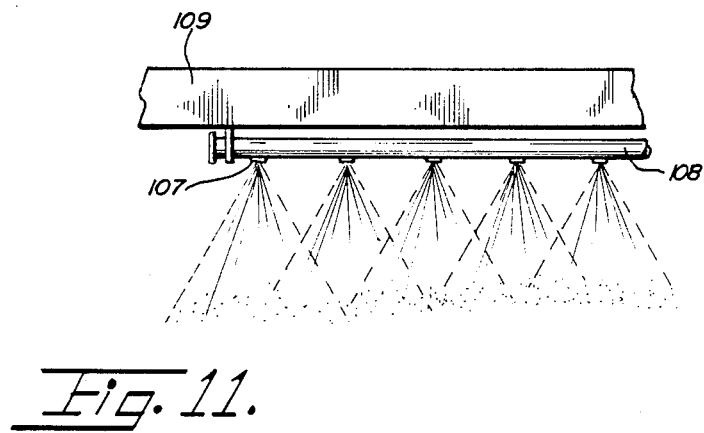
Fig. 11.

VEHICLE CLEANSING METHOD

This is a continuation of application Serial No. 07/100,098, filed Sept. 23, 1987, now abandoned, which was a divisional continuation-in-part of application Ser. No. 812,740 filed Dec. 23, 1985, now U.S. Pat. No. 4,716,916.

BACKGROUND OF THE INVENTION

This invention relates to vehicle cleansing and more particularly to a system for cleansing the exterior surfaces of vehicles in a manner which involves almost bullet-like impingement of streams of cleansing liquid (such as water) on portions suffering the greatest contamination buildup of road dirt or debris.

In normal use, the greatest buildup occurs along lower portions of the sides of vehicles, and also at the front end against and in areas of the grillwork and headlights. Some buildup occurs on the hood, windshield, and front roof portions, as well as along rear portions including dirt settled over the rear window area.

Car wash equipment employing brushes is relatively ineffective in removing dirt buildup in intricate vehicle recesses such as in and around the front grill and headlights. What might be called "brushless" car washes have heretofore been proposed, but those known have employed nozzles or spraying devices in arrangements that have been less than effective for reliable cleansing of the intricate design portions of the high dirt buildup areas.

SUMMARY OF THE INVENTION

In this invention, zero degree nozzles are used to produce said stream impingements of almost bullet-like impact of cleansing liquid on exterior vehicle surfaces, particularly the lower side surfaces and front end surfaces. Zero degree nozzles for solid stream impingement upon all areas of a vehicle are within the purview of this invention. However, the preferred approach is to employ somewhat fanning or spreading streams for the cleaning of several areas of lesser dirt buildup or areas such as openable window areas where the risk of forcing cleansing liquid into the vehicle interior is greatest when using bullet-like impingement.

The term "cleansing liquid" as used herein embraces many possibilities. It may consist of plain water or water per se, or water with a chemical cleaner or detergent in it, or even recycled water (which may contain, albeit not desired, minute particles or suspended dirt in addition to any dissolved detergent or chemical cleaners.)

A very important aspect of this invention is that of employing a horizontal array of zero degree nozzles in spaced relationship to each other along the linear length direction of the horizontal array. The zero degree nozzles should be arranged in a manner causing angular impingement of the emitted solid streams of cleansing liquid upon the exterior vehicle surfaces. Preferably, the impingement should never be at an angle closer to normal ("normal" being perpendicular or 90° to the surface) than approximately 80°. At 80° and lower the impingement impact is not likely to cause damage and is more effective to push off adhered particles of dirt or debris than a perpendicular or normal impact angle which would more or less tend to push or embed the dirt or debris on or into the surface of the vehicle. It will of course be recognized that the design contours of a vehicle may be such that some small portions may well suffer some fractional impingement at a 90° or normal angle; but those portions are relatively minute in area and generally are intricate in contour.

A still further important aspect of the invention is that of the oscillation of the horizontal array of zero degree nozzles back and forth in a plane transverse to the length of the horizontal array. The oscillation is exceedingly rapid, and in fact so rapid that zebra marks of cleanliness and noncleanliness on a vehicle exterior are in some essence avoided. In this respect, the invention contemplates means for effecting relative linear motion between horizontal arrays of nozzles and a vehicle undergoing cleansing.

Still further details and advantages and refinements of the invention will become evident as this description proceeds.

BRIEF DESCRIPTION OF THE DRAWINGS

FIG. 2 is a fragmentary schematic perspective view of the interior of the right side of the arch illustrated in FIG. 1, with the view illustrating the elements that face inwardly of the arch;

FIG. 3 is a fragmentary schematic perspective view of the horizontal assembly of nozzles at the top of the arch illustrated in FIG. 1;

FIG. 4 is a schematic cross-section through a paired zero degree nozzle group of the invention;

FIG. 5 is a fragmentary schematic view looking into the arch of FIG. 1 from a position forwardly and left of the left side of the arch of FIG. 1, illustrating particularly the angularity of the solid streams impinging an automobile;

FIG. 6 is a schematic diagram presented for discussion of the angularity features of the solid streams emitted from the zero degree nozzles;

FIG. 7 is a schematic plan view of the face of a fanning spray nozzle;

FIG. 8 is a diagramatic illustration of several equipment elements and steps for a treatment system for the exterior of vehicles;

FIGS. 9 and 10 are fragmentary schematic perspective views of alternate and zero degree nozzle assemblies; and, for purposes of orientation, the particular view of the illustrations in FIGS. 9 and 10 can be looked upon as a replacement for the lower left zero degree nozzle assembly of FIG. 1; and FIG. 11 is a plan view of a fragment of an upper nozzle assembly formed of fanning spray nozzles oriented along a line which is transverse to the direction of relative movement of a vehicle with respect to the upper nozzle assembly illustrated in this FIG. 11.

DESCRIPTION OF PREFERRED EMBODIMENTS

Figure 1:
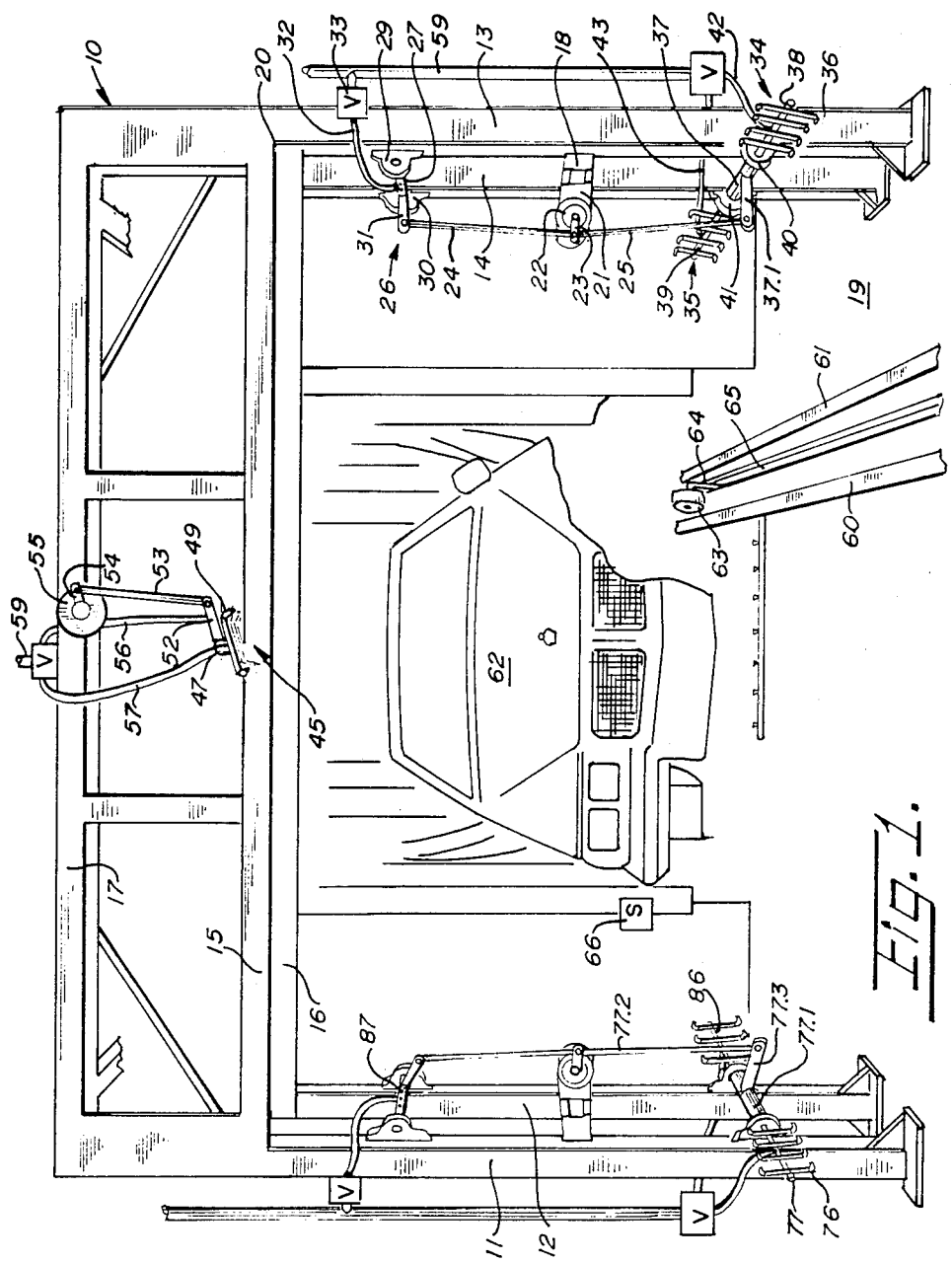
FIG. 1 is a schematic perspective view of an arch frame equipped with nozzle assemblies according to this invention, the view being taken from a vantage point spaced from the exit end of the arch and including a showing of a vehicle (partially broken away) spaced back from but heading toward the entrance side of the arch.

Referring to FIG. 1, a suitable frame 10 on which to mount the nozzle arrangements of the invention may take the form of an arch having an open space between lateral side members. The left side is formed by spaced upright beams 11 and 12, and the right by spaced upright beams 13 and 14. The top is formed by a cross beam structure of spaced beams 15 and 16 supported by the upright beams. Suitable brace elements are employed, as desired. A superstructure 17 of bracing suitably is employed to provide a mounting base for upper elements to be discussed. The arch is of a size which readily accommodates the passage of a vehicle through it, and preferably is of a size which is adapted to receive vans and small trucks. It may of course be of any larger size for accommodating even the largest vehicles permitted on highways.

The equipment on the left side of the arch is preferably the mirror image of that on the right; and for that reason the structure at the right side of the arch of FIG. 1 will be described in greatest detail, with particular reference to FIGS. 1 and 2. A brace bracket 18 is fixed between the right uprights 13 and 14 at a position about midway between the floor level 19 and the juncture 20 of cross beams 15 and 16. On that brace bracket 18 is fixed any suitable bracket 21 on which a motor 22 is mounted for the purpose of effecting oscillatory motion as discussed below. A hydraulic motor is suitable, but air driven motors and even electric motors may be used. Connecting lines or hoses or other means for supplying power to the motor are omitted from the drawing since they can vary and are well known. A crank arm 23 is fixed to the shaft of the motor; and upper 24 and lower 25 connecting rods are attached pivotally to the end of the crank arm by any suitable means such as a pin.

The right side upper nozzle assembly 26 consists of a horizontal pipe-like manifold 27 carrying a plurality of nozzles 28. The manifold 27 is journaled for pivot action in bearing assemblies 29 and 30 fixed to the horizontal upright 13 and 14. A swing arm 31 is rigidly fixed at one end to pipe manifold 27 and is connected by a pin to the upper connecting rod 24. The nozzles 28 of the side upper nozzle assembly are fixed to the pipe manifold and fed by fluid incoming through the flexible conduit 32 from a control valve 33. Control valve 33 receives fluid from main conduit 59.

The right side lower nozzle assembly (FIGS. 1 and 2) is horizontally oriented and made up of a rearwardly directed forward array of zero degree solid stream nozzles 34 and a forwardly directed rearward array 35. Each array preferably has a plurality of zero degrees nozzles 36 making up the array. The assembly for these lower arrays includes a horizontal central bar portion 37 (preferably a solid bar not serving as a conduit) having a forward pipe manifold 38 and a rearward pipe manifold 39 threadedly secured to each end of the bar portion 37. The entire assembly of bar 37 and forward manifold 38 and rear manifold 39 lies in a horizontal linear relationship parallel with the length of a vehicle undergoing washing or cleansing treatment. (The right and left lower horizontally oriented nozzle assemblies are in opposing parallel relationships.) Either the pipe manifolds 38 and 39 or the bar portion 37 of that right assembly is suitably journaled in bearing assemblies 40 and 41 fixed to the spaced uprights 13 and 14. A swing arm 37.1 is fixed at one end to bar 37 and pivotally attached to connecting rod 25 by a pin at the other, to provide for oscillatory motion of the nozzle assembly. The conduit 42 feeding water or other cleansing fluid to the forward pipe manifold is separate from the conduit 43 for the rearward pipe manifold. Valve 44 regulates the flow of fluid to the respective pipe manifolds 38 and 39. The arrangement permits control of the flow of fluid to the forward manifold entirely separately from the flow of fluid to the rear pipe manifold. A plurality, preferably about four but suitably from two to six, of transversly oriented paired nozzle groups 36 are shown spaced along both the forward and rear pipe manifolds, and are fed by fluid from the pipe manifolds. Details of this structure of transversely paired nozzles are discussed below; but here it should be noted that still other generally linear arrays of zero degree nozzles are also within the ambit of the invention.

It is emphasized that the structure above described for the right side of the arch has its mirror image on the left, as illustrated in FIG. 1.

Approximately centrally located along the upper cross beams 15 and 16 of the arch frame is a top nozzle assembly 45. As illustrated, this assembly is oriented in the linear horizontal direction parallel with the length of an automobile or other vehicle undergoing a washing or cleansing treatment. Referring particularly to FIGS. 1 and 3, this assembly, similar to the lower zero degree nozzle assemblies at each side of the arch, includes a central solid bar portion 46 to which is fixed a forwardly extending pipe manifold 47 at one end and a rearwardly extending pipe manifold 48 at the other. Each of these pipe manifolds is likewise fitted with a plurality of zero degree nozzles arranged suitably in laterally spaced (i.e., transversely spaced) pairs 49. The several paired nozzles 49 are spaced from each other along both the forward and the rearward pipe manifold of this assembly. The central bar 46 and the two pipe manifolds 47 and 48 are oriented in essentially a straight line and journaled for pivot action in bearings 50 and 51 mounted on cross beams of the upper arch portion. The central bar portion 46 has fixed to it a swing arm 52; and this swing arm is connected to an upright connecting rod 53 by a pin. The upright connecting rod in turn is connected by a pin or the like to a crank arm 54 mounted on the shaft of a motor 55 (lines of power to motor omitted). The motor 55 is mounted in any suitable way to brace members of the upper arch portion and is used to effect oscillatory motion of the top nozzle assembly. Flexible conduits or hoses 56 and 57 separately feed the forward manifold and rearward manifold respectively of this top assembly; and a special control valve 59 regulates when fluid is passed to each manifold from a main fluid conduit 59.

Illustrated in FIG. 1 also is a linear track means formed of side rails 60 and 61, for receiving and guiding the wheels of one side of a vehicle 62 undergoing cleansing treatment. The track includes any suitable means, now well known in the art, for effecting vehicle movement along the track. One such means consists of a roller 63 which bears against the rear of a vehicle wheel, the wheel being omitted to permit clarity of showing. The roller is on an arm 64 projecting through floor slot 65; and the arm is carried on a continuous conveyor located beneath the floor slot. Additionally illustrated in FIG. 1 is a sensor assembly 66 for sensing the beginning and end and thus the length of the vehicle to be washed. Any of a variety of known sensing equipment (e.g., electric eye devices) may be employed as is now well understood in this art. The sensing information is suitably processed by a computer or microprocessor, as is now conventional and known in this art, and may be used in a known manner to regulate valve positions to permit flow of fluid and terminate such flow.

Attention now is directed to FIG. 4 for a description of the basic nature of paired nozzle groups as may be used on the several pipe manifolds of the apparatus. The assembly of each such pair of zero degree nozzles is basically the same, but for the angular orientation thereof which will be explained below. In FIG. 4, an illustrative pipe manifold 66 is shown in cross section. This pipe manifold 66 may be any one of the pipe manifolds carrying an array of zero degree nozzles. Each paired group suitably is carried on a stub pipe connector 67 which is threadedly fastened in the pipe manifold; and to the stub connector 67 is threadedly fixed a T-fitting 68. Each end of the crossbar of the T-fitting is threadedly equipped with an elbow fitting 69 and 70; and the elbow fittings are then threadedly fitted with zero degree nozzles 71 and 72. Zero degree nozzles are characterized by having a cylindrical exit bore of uniform diameter along its length. The bore generally should be at least about 3 millimeters in length and preferably longer. The round bore extends to the very terminal portion of the nozzle from which the solid stream is emitted. Characteristically, zero degree nozzles have a "bellied" space 74 or enlarged conduit portion (as compared to the bore size) interiorly behind the cylindrical bore portion 73. Within this larger bellied or "reservoir" portion 74 suitably is located a stabilizing element 75 for enhancing solid-stream emission at the open outer end of the bore 73. An illustrative stabilizer simply may consist of cross bars of wire. Another such stabilizer may be a wire in the configuration of a figure "8"; but the outer upper and lower curvature for each loop of the figure "8" serves as the mounting element for lodging in an annular interior recess of the bellied portion. Thus a figure "8" stabilizer of wire in effect presents cross-bar portions of the figure "8" as the effective stabilizing element structure. Generally the reason for using a stabilizer is simply because, when liquid bends a corner as in an elbow connection just before entering a zero degree nozzle, internal turbulence is created which tends to produce a somewhat unstable and even possibly a distorted spray pattern. The stabilizing element, while not always critical, tends to minimize such internal turbulence and improve steady flow through the nozzle, thereby improving the pattern stability and uniformity for a zero degree solid-stream emission by the nozzle. The most preferred zero degree nozzles have a cylindrical bore in excess of 4 millimeters in length and preferably no more than about 10 millimeters in length. However, the most important relationship is that the length of the cylindrical bore should exceed at least by about three times the diameter of it. In practicing the invention, zero degree nozzles having a bore diameter of at least 0.5 millimeter should be used, and generally such nozzles should have a bore diameter of at least about one millimeter. Optionally, those having a bore up to about 5 millimeters in diameter may be employed, although bores have about 3 millimeters in diameter are generally larger than necessary to employ. The smaller diameter solid streams emitted from the preferred bore sizes contribute to improved dirt "lifting" by the solid stream without effecting any substantial dirt embedding action by that stream as it is employed in the angularity relationships of this invention.

It is emphasized that the solid stream emission from the zero degree nozzles is characteristic of them. They cause a solid stream (not a fanning or fanned stream) because of the features of their design as aforenoted.

The angularity relationships will now be discussed in connection with illustrations in FIGS. 5 and 6. As shown in FIG. 5 (elements in FIG. 5 apart from the vehicle are numbered as at the left in FIG. 1), the vertically spaced zero degree nozzles 76 of each pair carried by the forward manifold portion 77 are so adjusted as to effect a solid-stream emission which is at an angular relationship to the horizontal linear stretch or length for the forward pipe manifold 77. To be noted is that the preferred arrangement is to orient the lower nozzle of each pair to effect a solid stream emission 78 along a line which is at a slightly greater angle from the horizontal pipe manifold 77 than the emission 79 effected by the orientation of the upper nozzle of the pair. Stated another way, the solid stream emission 79 from the upper nozzle of each pair 76 is at a slightly smaller angle from the horizontal linear length dimension of the pipe manifold 77 than the solid stream 78 emitted by the lower zero degree nozzle of each pair. The angle between the two streams emitted from a pair suitably is as small as a 0.1°, or even smaller fraction of a degree, up to as large as possibly 2°, but preferably not larger than about 1°. Further, the solid stream emitted by each and every zero degree nozzle is not such as to strike the side surface of the vehicle 80, or any other overall surface of the vehicle, at a 90° angle (that is, at an angle normal to the overall plane of such surfaces).

For further discussion of the angularity of solid streams, reference is made to FIG. 6 where solid line 81 illustrates a horizontal pipe manifold (having its terminal end at the bottom of line 81) carrying a plurality of zero degree nozzles, dash line 82 illustrates a line perpendicular to the pipe manifold, and wavy line 83 illustrates a solid stream emitted from a zero degree nozzle. (The solid stream is not wavy, but such a line distinguishes from the others.) Overall surfaces of a vehicle are graphically represented in FIG. 6 to permit reference to the overall plane of such surfaces. Thus short line 84 is either the front or rear end of a vehicle; and the line 85 is either a side or top surface of vehicle. The angle identified "A" (that is the angle between the line 81 for the pipe manifold and the wavy line 83 representing the solid stream from a zero degree nozzle) may vary, but should never be less than 40° nor more than about 80° for every zero degree nozzle solid stream of the invention. Accordingly, the impact of a solid non-fanning stream from a zero degree nozzle on a vehicle side surface would also be between 40° and 80° with respect to the overall planar extent of the side surface, whereas the angle of impact of the same solid stream on the end vehicle surface would be between 10° and 50° with respect to the overall planar extent of the end surfaces.) That angle "A" is preferably within the range of between about 50° and 75° for the side zero degree nozzle assemblies. (Conversely, or as a corollary, the angle labeled "B" in FIG. 6 should never be less than about 10° nor in excess of about 50°, and preferably is between approximately 15° and 40°.) To be particularly recognized from the foregoing is the fact that the solid stream impingement of impact upon overall surfaces of an automobile will always be in an angular relationship to the overall plane of the surface. For example, the preferred angular impingement upon the side vehicle surfaces would from the above discussion be at an angle between 50° and 75°, whereas angular impingement on end vehicle surfaces would be between 50° and 40°. The angle labeled "A" in FIG. 6 will now further be discussed with reference to specific arrays of zero degree nozzles of the invention.

Referring particularly to FIGS. 1 and 2, the zero degree nozzles carried by the forward pipe manifolds 38 and 77 at the lower sides of the arch are oriented such that the solid streams emitted from them are directed somewhat rearwardly and at an "A" angle (with respect to the length of the pipe manifolds 38 and 77) within the range aforenoted, but most preferably at about 65° plus or minus about 5°. Thus, the front end of an automobile or vehicle moving through the arch of FIG. 1 is hit by these solid streams at an angle of about 25° plus or minus 5° with respect to the overall front end surface. As the vehicle moves further through the arch, the sides of the vehicle received the impact of these solid streams; and, since the sides are essentially parallel with the length of the pipe manifolds 38 and 77, the angularity of impact against them is the same or substantially the same as the "A" angle relationship of the solid streams.

Now refer to the array of zero degree nozzles carried by the rear pipe manifolds 39 and 86 at the lower sides of the arch. These nozzles are oriented to effect a forward direction for their solid stream emissions, but at an "A" angle relationship (with respect to the pipe manifolds 39 and 86) comparable to that angle aforediscussed for the zero degree nozzles along the forward pipe manifolds 38 and 77. That preferred "A" angle relationship is 65° plus or minus 5°. Thus, the solid streams from the nozzle array on the rear pipe manifold 39 and the solid streams from forward pipe manifold 38 on the right side of the arch tend to converge toward the central portion of the arch; and a similar observation can be made for the solid streams from the zero degree nozzles on the rear pipe manifold 86 and front pipe manifold 77 at the left side of the arch. The arrangement effectively causes front and rear surfaces as well as side sufaces of a vehicle moving through the arch to be struck with bullet-like angled impingements or impacts of solid streams from the zero degree nozzle assemblies. More will be said about this below in discussing oscillation of the assemblies.

Now referring to FIGS. 1 and 3, the zero degree nozzles spaced along the forward pipe manifold 47 at the top of the arch are oriented to cause their solid streams to be directed somewhat rearwardly but substantially downwardly, with an "A" angle (see FIG. 6) no greater than about 80° but preferably at least about 70° from a horizontal. Other angulation may be employed within the most broad ranges aforediscussed; but the preferred angularity just mentioned is effective for high impact cleaning of top surfaces of vehicles of varying height. Similarly, the zero degree nozzles carried by the rear pipe manifold 48 of the top nozzle assembly are oriented to effect an "A" angle relationship for their solid streams lying in the preferred range just mentioned for the zero degree nozzles carried by the forward manifold 47. These solid streams are in a forward direction or direction toward the solid streams from the nozzle assemblies on the forward manifold 47.

Recognize that while zero degree nozzle assemblies may be made up of nozzles grouped in pairs, it is not critical that they be so grouped. In the paired arrangement, the nozzles of each pair are spaced from each other in a direction transverse to the linear length of the horizontal array so as to form two essentially linear lines of spaced zero degree nozzles in the horizontal array. The angular orientation of each zero degree nozzle in either linear line (i.e., each) is preferrably identical or essentially the same for each such nozzle of the line. However, the angular orientation selected for the nozzles in one line is preferably fractionally different from the angular orientation selected for the nozzles in the other linear line of the paired groups, but not by more than about 2°. Thus the emissions of each linear line are preferrable essentially parallel, but those from one line are preferably at a slightly different angle from those of the other.

The side upper manifolds 87 at the left and 27 at the right of the arch of FIG. 1 are equipped with a plurality of spray nozzles suitably of the fanning type. As illustrated in FIG. 7, the face 88 of such nozzles preferably has an elongated opening 90 tapering inwardly to an inner cylindrical bore 89 so as to more or less cause a flaring or flattening or fanning and spreading of the spray from the nozzle. The orientation of the fanned spray or flare of the spray preferably is in the horizontal direction as those nozzles are mounted on the respective manifolds 27 and 87. Preferably, each manifold 27 and 87 is equipped with at least two such spraying nozzles and may be equipped with more. Illustratively, the fan of the flattened spray may vary from anything approximating 5° up to probably 20° or 30°. The purpose of the flattened spray effect is to spread liquid, which also has the effect of reducing the impact of pressurized fluid as it strikes the surfaces of an automobile such as side window areas.

The spacing between the sides of a vehicle to be washed and the side zero degree nozzle arrays should not exceed approximately 1 meter (or about 3 feet), and preferably lies within approximately 0.2 meter (or about half a foot) up to about 0.8 meter (about 2.5 feet). Within such side distances, the solid streams emitted have a very powerful cleaning impact on the surface of the automobile, even including the front and rear surfaces where the distance the stream travels is somewhat greater than that for impingement along the sides. The impact of impingement is essentially bullet-like in character under such distance conditions, and very uncomfortable to experience on one's skin.

The fluid conduited to the several pipe manifolds and nozzles of the invention should be from any source maintained at a pressure of at least approximately 125 pounds per square inch, and even as high as 400 or 600 or more pounds per square inch. The higher pressures are especially important where the smaller bore zero degree nozzles are used.

Each array of zero degree nozzles, and preferably also the arrays of fanning nozzles, is equipped with means for effecting oscillatory motion for the same. The extent of oscillation or degree of rotary pivot action of the pipe manifolds is easily adjusted by varying the length of the swing arms and crank arms aforediscussed. Oscillatory of the top arrays of pipe manifolds 47 and 48 is adjusted so that the solid streams from those zero degree nozzles sweep transversely back and forth across the full extent of the roof area of a vehicle or at least substantially to that extent. The side zero degree nozzle assemblies at the lower side portions of the arch are most preferably adjusted in their degree of oscillation so that the upper extent of the solid stream emission on oscillation strikes the side of a vehicle below or at approximately the level of the base of the side windows of the vehicle and the lower extent of the oscillation effects a striking of the solid streams upon the very lowest portion of the body parts of the vehicle (or even lower), thus effecting a powerful work impact on those portions suffering high road dirt buildup. In the case of spray nozzles an oscillatory sweep may also be used. The degree of oscillation for the side upper manifolds 27 and 87 carrying spray nozzles desirably is maintained within limits effecting a spray from approximately the base of the window areas of a standard vehicle upwardly to the top area just above the windows, or even somewhat higher, as desired for coverage along the upper surfaces of higher vehicles such as vans.

The rate of oscillation or oscillatory motion should be in excess of about 150 cycles per minute, especially for the zero degree nozzle assemblies. The most preferred rate is relatively dependent upon the relative movement between a vehicle to be cleaned and the nozzle arrays. That relative movement generally will never be lower than 10 feet or 3 meters per minute and preferably will exceed 30 feet or 9 meters per minute and even be possibly 100 feet or 30 meters per minute, depending on the other parameters used in designing a particular auto washing or cleansing facility. As the rate of relative movement increases, the rate of oscillation should also increase even to the extent of 400 or 500 cycles per minute, so that essentially every fractional surface of the high-dirt buildup areas of the vehicle is struck by an impinging zero degree stream having a zig-zag pattern of impact on the surfaces of the vehicle but a zig-zag pattern which is extremely tight (i.e., little spacing between the up and down pattern of impact), yet nevertheless a pattern of impact not effecting repetitive impact sweeps along a single line without a fractional time passage before a further impact sweep along that line is effected. The tight pattern of impact as well as the multiple plural nozzle arrays contribute to a result which easily avoids any zebra-like cleaning effect on the surface of a vehicle.

In one form of preferred operation, a vehicle entering the arch of FIG. 1 and moved along the track is sensed for its front and by the sensor which, through circuitry not shown, effects timed shift or adjustment of valve positions in the various valve assemblies for the nozzle arrangements of the arch. As the vehicle moves further toward the arch, the valves controlling flow to the forward bank or array of rearwardly directed zero degree nozzles in the top and each side lower assembly is shifted responsively to the message from the sensor so that those valves open flow of cleansing fluid, as an initial step, only to the forward bank or array of each assembly of zero degree nozzles. Either at the same time or on a slight time delay, depending on the relative motion of the vehicle with respect to the manifolds carrying the nozzles, the valve controlling flow to the side upper manifolds equipped with fanning spray nozzles is opened responsively to a message pre-programmed in circuitry responsive to the sensor. Based on the rate of movement by the vehicle, or on sensor detection of the terminal end of the vehicle, the control circuitry effects a shift of the valves for the zero degree nozzle assemblies so that the forward arrays which direct fluid rearwardly are no longer fed fluid, and the feeding of fluid from the main line is opened to the rear pipe manifolds carrying the forwardly directed zero degree nozzles. Finally, as a result of a pre-programmed time delay or responsively to sensor detection of the terminal end of a vehicle, all valves assumes a neutral closed position after the end of the vehicle reaches at least a midway point through the arch. any of a variety of sensing and control systems for valve shifting may be employed, as is now well known in the art.

It should be appreciated that fundamental teachings for the oscillating arrays of zero degree nozzles and the angularity characteristics thereof may be employed for apparatus which is moved along the length of a vehicle with the vehicle remaining stationary as distinct from an arch fixed in location with a vehicle moved through it. Optionally, brushes or other contact cleansing means may, if desired, be employed in conjunction with the teachings herein. Still further, a variety of equipment and steps may be incorporated in a vehicle washing or cleansing and exterior treatment facility in addition to zero degree nozzle treatments.

Referring now to FIG. 8, an example of a treatment facility incorporating principles of the invention will be outlined. A vehicle 90 moving in the direction of the arrow in FIG. 8 may first pass through a station 91 where a water solution of a detergent may preliminary be sprayed over surfaces of the vehicle. The vehicle may then move through a gateway of doorway 92 having suspended flexible flaps to protect entrance workers from the mist created in and about subsequent treatment stations. Undersurfaces of the vehicle may be sprayed with cleansing or water solutions to remove at least some of the accumulated debris and dirt from those surfaces. Continued movement of the vehicle passes it through a station 93 which may consist of the arch of FIG. 1, for impact cleansing of debris from its surfaces by any cleansing solution including plain water. An arch spray station 94 of fanned nozzles for further rinsing with plain water may follow. A subsequent station 95 may apply a spray wax or other finish upon the vehicle, with the final step being preferably that of passing it through a blower drying station 96, possibly followed by hand wiping of selected surfaces.

Again referring to FIG. 8, a different sequence of steps may be employed. For example, after the vehicle 90 is sprayed with detergent at station 91, it may simply be sprayed with a further detergent solution from fan nozzles at the station 93; or possibly some zero degree nozzle treatment may be incorporated at station 93 for the lowest portions of the vehicle. Thereafter, at station 94 an oscillating zero degree nozzle arrangement (including features of the arch of FIG. 1) may be employed with clean water to effect final dirt dislodgement as well as rinsing. Still other procedural steps and stations for specialized treatments may be employed.

Reference is now made to FIGS. 9 and 10 for a discussion of alternate structures of linear alignments of zero degree nozzles in linear arrays thereof. The horizontal nozzle assembly of FIG. 9 has a central solid bar 97 carrying a forward pipe manifold 98 and rearward pipe manifold 99. A swing arm 100 is fixed to the solid bar portion 97 and other linkages comparable to those discussed for FIG. 1 are employed for the purpose of providing for oscillatory motion. A single linear alignment of zero degree nozzles is on each pipe manifold. The forward pipe manifold 98 carries the linear alignment of rearwardly directed zero degree nozzles 101; and the rearward manifold 99 carries the forwardly directed rearward array of zero degree nozzles 102. The angularity characteristics of the zero degree nozzles in linear alignment is as aforediscussed with respect to the zero degree nozzles for the side horizontally oriented zero degree nozzle assemblies of the frame arch of FIG. 1. The streams emitted are such that they are substantially parallel for the forward array and substantially parallel for the rearward array of nozzles; but an angularity variation up to about 2° is reasonable and clearly within the concept of this substantial parallelism.

The zero degree nozzle assembly illustrated in FIG. 10 is similar in structure to that of FIG. 9; and, for that reason, common elements are given like numbers for identification. The difference between FIGS. 9 and 10 lies in the arrangement of the zero degree nozzles on each pipe manifold. In FIG. 10, the zero degree nozzles are fitted on elbows joined in close spaced relationship along diametrically opposing lines along the length of the manifolds. Still further, the zero degree nozzles 103 in linear alignment are staggered with respect to those of the linear alignment 104 on the forward pipe manifold; and, likewise, the zero degree nozzles 105 in linear alignment on the rearward manifold 99 are in staggered relationship with respect to those of the linear alignment 106 carried on that manifold. Again, the angularity characteristics for the forward array and the rearward array are as aforediscussed.

The purpose of FIG. 11 is to illustrate the option of employing fanning spray nozzles 107 in a horizontal alignment for the upper portion of an arch through which a vehicle is passed. The fanning nozzles 107 are fed through a manifold 108 and the manifold itself is fixed to a crossbeam 109. The manifold 108 is horizontally aligned in a direction transverse to the relative motion of a vehicle undergoing treatment. The illustration of FIG. 11 suitably may be employed as a replacement for the zero degree nozzles on the upper or top cross member of the structure of the arch illustrated in FIG. 1, should one desire to employ such an arrangement in combination with lateral zero degree nozzle assemblies such as aforediscussed.

It will be appreciated that the invention may further be embodied in still other specific forms without departing from the spirit or essential characteristics thereof. The present embodiments are therefore to be considered as illustrative with the scope of the invention being indicated by the appended claims and such valid construction thereof as embraces the equivalents to which they are entitled.

That which is claimed is:

1. In a method for cleansing exterior surfaces of vehicles wherein relative linear motion is effected between the vehicle undergoing treatment and nozzle assemblies, with the relative linear motion being parallel to the length of the vehicle, the improvement comprising:
   (a) applying a liquid detergent solution upon exterior surfaces of the vehicle, and
   (b) impinging upon an end and side surface of the vehicle during said linear motion a compact zig-zap pattern of a plurality of bullet-like solid streams of cleansing fluid from zero degree solid stream nozzles fixedly arranged in a horizontal array extending parallel to the length of the vehicle and while said horizontal array is undergoing oscillation in a direction transverse to the length direction thereof, with the zero degree nozzles of the array each being at an angular orientation with respect to the length direction of said array such that the solid streams emitted therefrom are from about 40° up to about 80° from said length direction and thus impact upon the end and side vehicular surfaces at an angle never in excess of about 80° with respect to the overall planar extent of such surfaces, whereby perpendicular solid stream impingement upon such surfaces is essentially avoided and debris upon the surfaces is pushed off at an angle.

2. In a method for cleansing exterior surfaces of vehicles wherein relative linear motion is effected between the vehicle undergoing treatment and nozzle assemblies, with the relative linear motion being parallel to the length of the vehicle, the improvement comprising:
   (a) applying a liquid detergent solution upon exterior surfaces of the vehicle, and
   (b) angularly impinging upon an end and side surface of the vehicle during said linear motion a compact zig-zag pattern of a plurality of bullet-like solid non-fanned streams of cleansing fluid from at least one linear alignment of zero degree solid stream nozzles fixedly arranged in spaced relationship in a horizontal array located laterally of the length of the vehicle and while said horizontal array is undergoing oscillation in a direction transverse to the length direction thereof at a rate in excess of 150 cycles per minute, with the solid non-fanned streams emitted from the linear alignment of solid stream nozzles being substantially parallel but angularly impinging upon the end vehicular surface at an angle between 10° and 50° with respect to the overall planar extent of said end sruface and angularly impinging upon the side vehicular surface at an angle between 40° and 80° with respect to the overall planar extent of said side surface, whereby perpendicular solid stream impingement upon such surfaces is essentially avoided and debris upon the surfaces is pushed off at an angle.

3. The method of claim 1 wherein the angular impingement of the solid non-fanned streams on the end vehicular surface is between 15° and 40°, and the angular impingement of the same solid non-fanned streams is between 50° and 75° on the side vehicular surface.

4. A method for cleansing exterior surfaces of a road vehicle, comprising:
   (a) effecting relative linear motion in a horizontal direction between the vehicle undergoing cleansing treatment and a horizontal array of zero degree solid stream non-fanning nozzles in such a manner that the relative linear motion is parallel to the length of the vehicle,
   (b) orienting at least one linear alignment of a plurality of said zero degree nozzles fixedly arranged in spaced linear relationship as said horizontal array at a location laterally of the length of the vehicle undergoing treatment for substantially parallel solid non-fanning stream emission from said zero degree nozzles and for angular impingement of such emitted streams upon an end and a side surface of the vehicle during said relative linear motion, with the angular impingement upon the end vehicular surface between 10° and 50° with respect to the overall planar extent of said end surface, and with the angular impingement upon the side vehicular surface between 40° and 80° with respect to the overall planar extent of said side surface,
   (c) oscillating said horizontal array in a direction transverse to the horizontal length direction thereof at a rate in excess of 150 oscillations per minute during said relative linear motion, and
   (d) passing cleaning fluid under a pressure of at least 125 pounds per square inch through said oscillating horizontal array of zero degree nozzles during said relative linear motion to thereby effect said aforenoted angular impingement of the solid non-fanning streams on an end and a side surface of the vehicle in a vertical compact zig-zag pattern whereby perpendicular solid non-fanning stream impingement upon such surfaces is essentially avoided and debris upon the surfaces is pushed off at an angle.

5. In a method for cleansing exterior surfaces of vehicles while relative linear motion is effected between the vehicle undergoing treatment and an assembly of nozzles, with the relative linear motion being parallel to the length of the vehicle, each of the front, rear, top and side exterior surfaces of the vehicle being characterized as an overall planar exterior surface, the improvement comprising impinging upon an overall planar exterior surface of the vehicle during said linear motion a compact zigzag pattern of a plurality of bullet-like solid streams of cleansing fluid from zero degree nozzles fixedly arranged in a linear alignment along a pipe manifold while said linear alignment as a unit is undergoing oscillation in a direction transverse to the length direction thereof at a rate in excess of 150 cycles per minute, with said solid streams from the oscillating alignment of the zero degree nozzles impinging upon the overall planar exterior surface of the vehicle in parallel lines and with each solid stream impinging at an angle not in excess of 80 degrees with respect to the overall planar extent of such surface throughout the extent of the line of its oscillating impingement, whereby the combination of the relative linear motion and the oscillating linear alignment effectively avoids perpendicular impingement upon the overall planar vehicular surface and debris upon the surface is pushed off at an angle.

6. In a method for cleansing exterior surfaces of vehicles while relative linear motion is effected between the vehicle undergoing treatment and an assembly of nozzles, with the relative linear motion being parallel to the length of the vehicle, each of the front, rear, top and side exterior surfaces of the vehicle being characterized as an overall planar surface, the improvement comprising angularly impinging upon an overall planar exterior surface of the vehicle during said linear motion a compace zigzag pattern of a plurality of bullet-like solid non-fanned streams of cleansing fluid from at least one oscillating linear alignment of a plurality of zero degree solid stream nozzles fixedly arranged in spaced relationship lengthwise on a pipe manifold, said impingement being effected while said pipe manifold is oscillating in a direction transverse to the length direction thereof at a rate in excess of 150 cycles per minute, to thereby effect a parallel pattern of impinging solid streams upon the overall planar vehicular surface, the angularity of the impinging solid streams upon the overall planar vehicular surface being at least 10 degrees and not in excess of 80 degrees with respect to the overall planar extent of the vehicular surface at all time during the oscillation of said pipe manifold, whereby perpendicular solid stream impingement upon such surface is essentially avoided and debris upon the surface is pushed off at an angle.

7. A method for cleansing exterior surfaces of a road vehicle, comprising:
(a) effecting relative linear motion between the vehicle undergoing cleansing treatment and a linear array of a plurality of zero degree solid stream non-fanning nozzles in such a manner that the relative linear motion is parallel to the length of the vehicle,
(b) oscillating said linear array in a direction transverse to the length direction thereof at a rate in excess of 150 cycles per minute during said relative linear motion while maintaining said linear array oriented for angular impingement of solid streams of cleansing fluid from said nozzles upon an exterior surface of the vehicle during said relative linear motion, with the angular impingement at all times during the oscillation of said linear array being between 10 degrees and 80 degrees with respect to the overall planar extent of said surface, and
(c) passing cleansing fluid under a pressure of at least 125 pounds per square inch through said oscillating array of zero degree nozzles during said relative linear motion of thereby effect said aforenoted angular impingement of the solid non-fanning streams on the exterior surface of the vehicle, whereby perpendicular non-fanning solid stream impingement upon such surface is essentially avoided and debris upon the surface is pushed off at an angle.

8. In a method for cleansing exterior surfaces of road vehicles while relative linear exterior is effected between the vehicle undergoing treatment and an assembly of nozzles, with the relative linear motion being parallel to the length of the vehicle, the improvement comprising:
(a) mounting a plurality of zero degree solid stream nozzles in spaced linear alignment on a pipe manifold,
(b) oscillating the pipe manifold in a back and forth direction transverse to the length of the pipe manifold at a rate in excess of 150 cycles per minute, thereby to cause solid stream emissions from said zero degree nozzles to sweep as a group in a back and forth direction for impact upon the overall planar extent of the exterior surface of the vehicle undergoing treatment in spaced parallel lines,
(c) orienting the linear alignment of zero degree nozzles for impact of solid stream emissions therefrom at an angle between 10 degrees and 80 degrees with respect to the overall planar extent of the exterior surface of the vehicle at all points of said impact during the back and forth sweep of the solid streams, and
(d) feeding pressurized cleansing fluid to the pipe manifold to effect the solid stream emissions from said nozzles.

9. In a method for cleansing exterior surfaces of vehicles while relative linear motion is effected between the vehicle undergoing treatment and an assembly of nozzles, with the relative linear motion being parallel to the length of the vehicle, each of the front, rear, top and side exterior surfaces of the vehicle being characterized as an overall planar exterior surface, the improvement comprising:
a. applying a liquid detergent solution upon an overall planar exterior surface of the vehicle,
b. impacting upon said exterior surface of the vehicle a plurality of parallel solid streams of cleansing fluid from zero degree solid stream nozzles fixedly arranged in equal spacing along a linear alignment while said linear alignment is oscillated in a transverse direction to the length thereof, and
c. maintaining said impacting by said parallel solid streams at an angle less than 80° with respect to said exterior surface at all times, whereby said parallel solid streams never converge and never strike any single point on said exterior surface of the vehicle at the same time and debris upon said exterior surface is dislodged and removed at an angle.

10. In a method for cleansing exterior surfaces of vehicles while relative linear motion is effected between the vehicle undergoing treatment and an assembly of nozzles, with the relative linear motion being parallel to the length of the vehicle, each of the front, rear, top and side exterior surfaces of the vehicle being characterized as an overall planar exterior surface, the improvement comprising impinging upon an overall planar exterior surface of the vehicle during said linear motion a compact zigzag pattern of a plurality of bullet-like solid streams of cleansing fluid from zero degree solid streams nozzles arranged in a linear alignment while said linear alignment as a unit is undergoing oscillation in a direction transverse to the length direction thereof, with said solid streams from the oscillating alignment impinging upon the overall planar exterior surface of the vehicle in parallel lines and with each solid stream impinging at an angle not in excess of 80 degrees with respect to the overall planar extent of such surface throughout the extent of the line of its oscillating impingement, whereby the combination of the relative linear motion and the oscillating linear alignment effectively avoids perpendicular impingement upon the overall planar vehicular surface and debris upon the surface is pushed off at an angle.

11. A method for cleansing exterior surfaces of a road vehicle, comprising:
(a) effecting relative linear motion between the vehicle undergoing cleansing treatment and a linear array of a plurality of zero degree solid stream nozzles in such a manner that the relative linear motion is parallel to the length of the vehicle,
(b) oscillating said linear array in a direction transverse to the length direction thereof during said relative linear motion while maintaining said linear array oriented for angular impingement of solid streams of cleansing fluid from said nozzles upon an exterior surface of the vehicle during said relative linear motion, with the angular impingement at all times during the oscillation of said linear array being not in excess of 80 degrees with respect to the overall planar extent of said surface, and
(c) passing cleaning fluid under pressure through said oscillating array of zero degree nozzles during said relative linear motion to thereby effect said aforenoted angular impingement of solid streams on the exterior surface of the vehicle, whereby perpendicular solid stream impingement upon such surface is essentially avoided and debris upon the surface is pushed off at an angle.

12. In a method for cleansing exterior surfaces of road vehicles while relative linear motion is effected between the vehicle undergoing treatment and an assembly of nozzles, with the relative linear motion being parallel to the length of the vehicle, the improvement comprising:
(a) mounting a plurality of zero degree solid stream nozzles in spaced linear alignment on a pipe manifold,
(b) oscillating the pipe manifold in a direction transverse to the length of the pipe manifold, thereby to cause solid stream emissions from said zero degree nozzles to sweep as a group in a back and forth direction for impact upon the overall planar extent of the exterior surface of the vehicle undergoing treatment in spaced substantially parallel lines,
(c) orienting the linear alignment of zero degree nozzles for impact of solid stream emissions therefrom at an angle not in excess of 80 degrees with respect to the overall planar extent of the exterior surface of the vehicle at all points of said impact during the oscillating sweep of the solid streams, and
(d) feeding pressurized cleansing fluid to the pipe manifold to effect the solid stream emissions from said nozzles.

* * * * *